United States Patent [19]

Hayakawa et al.

[11] Patent Number: 5,158,338
[45] Date of Patent: Oct. 27, 1992

[54] AUTOMOTIVE SEAT ASSEMBLY

[75] Inventors: Hatsuo Hayakawa; Mikio Honma; Hidemasa Hirakui, all of Yokohama; Hideki Irie; Mikio Fujiwara, both of Kanagawa, all of Japan

[73] Assignees: Ikeda Bussan Co., Ltd., Ayase; Ohi Seisakusho Co., Ltd., Yokohama, both of Japan

[21] Appl. No.: 651,022

[22] Filed: Feb. 5, 1991

[30] Foreign Application Priority Data

Feb. 9, 1990 [JP] Japan .................................. 2-28256

[51] Int. Cl.⁵ .............................................. B60N 2/00
[52] U.S. Cl. ..................................... 297/335; 297/344
[58] Field of Search ............... 297/331, 335, 336, 344; 296/65.1

[56] References Cited

U.S. PATENT DOCUMENTS 3,059,964 10/1962 Hoppe et al. ...................... 296/65.1
5,106,144 4/1992 Hayakawa et al. ................ 296/68.1

FOREIGN PATENT DOCUMENTS 818829 4/1986 Japan ................................. 297/335

Primary Examiner—Kenneth J. Dorner
Assistant Examiner—Cassandra L. Hope
Attorney, Agent, or Firm—Foley & Lardner

[57] ABSTRACT

A seat assembly for a motor vehicle is shown which comprises a lower rail secured to a floor of the vehicle; an upper rail slidably engaged with the lower rail; a base structure secured to the upper rail to move therewith; a seat cushion held by the base structure in a manner to pivot between a horizontal operative condition and an upright inoperative condition; a seat slide latching mechanism for latching the upper rail to the lower rail, the seat slide latching mechanism having a first cancelling device which cancels the latched condition of the upper rail when actuated; a seat cushion latching mechanism for latching the seat cushion at both the horizontal operative and upright inoperative positions relative to the base structure, the seat cushion latching mechanism having a second cancelling device which cancels the latched condition of the seat cushion when actuated; and a latch cancel inhibiting mechanism which inhibits the actuation of one of the first and second cancelling devices when the other of the first and second cancelling devices is being actuated.

10 Claims, 12 Drawing Sheets

AUTOMOTIVE SEAT ASSEMBLY

BACKGROUND OF THE INVENTION

1. Field of the Invention

The present invention relates to seats for commercial cars, such as van-type motor vehicles, and more particularly, to seat assemblies of a type which is equipped with both a seat slide mechanism by which the seat proper can slide between front and rear given latched positions and a seat cushion folding mechanism by which the seat cushion can pivot between horizontal and upright latched positions.

2. Description of the Prior Art

In van-type motor vehicles or the like, slidable and foldable seats are widely used as a rear seat. In fact, when the associated vehicle is intended to be used as a luggage carrying car, the seat cushion is folded up and then the seat assembly is slid forward to a front latched position. With this, a luggage carrying space defined at a rear space of the vehicle cabin is increased. While, when the vehicle is intended to be used as just a passenger car, the seat assembly is moved rearward to a rear latched position and then the seat cushion is pushed down to assume a horizontal position.

One of the conventional seat assemblies of such type comprises generally two lower rails secured to a vehicle floor, two upper rails slidably engaged with the lower rails and mounting thereon a seat proper, a seat cushion latching mechanism for latching the seat cushion at both the horizontal and folded up positions, a seat slide latching mechanism for achieving a latched engagement between the upper and lower rails at a given position of the upper rails relative to the lower rails and a latch cancelling mechanism for cancelling the latched engagement between the upper and lower rails.

However, due to its inherent construction, the seat assembly of this type has the following drawback.

That is, when the latch cancelling mechanism is incidentally touched or actuated by a person who is manipulating the seat cushion latching mechanism for folding the seat cushion, unexpected sliding of the seat assembly tends to occur. This is dangerous or at least uncomfortable.

SUMMARY OF THE INVENTION

It is therefore an object of the present invention to provide a seat assembly which is free of the above-mentioned drawback.

According to the present invention, there is provided a seat assembly for a motor vehicle, which comprises a lower rail secured to a floor of the vehicle; an upper rail slidably engaged with the lower rail; a base structure secured to the upper rail to move therewith; a seat cushion held by the base structure in a manner to pivot between a horizontal operative position and an upright inoperative position; a seat slide latching mechanism for latching the upper rail to the lower rail, the seat slide latching mechanism having a first cancelling means which cancels the latched condition of the upper rail when actuated; a seat cushion latching mechanism for latching the seat cushion at the horizontal operative and upright inoperative positions relative to the base structure, the seat cushion latching mechanism having a second cancelling means which cancels the latched condition of the seat cushion when actuated; and a latched cancel inhibiting mechanism for inhibiting the actuation of one of the first and second cancelling means when the other of the first and second cancelling means is actuated.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
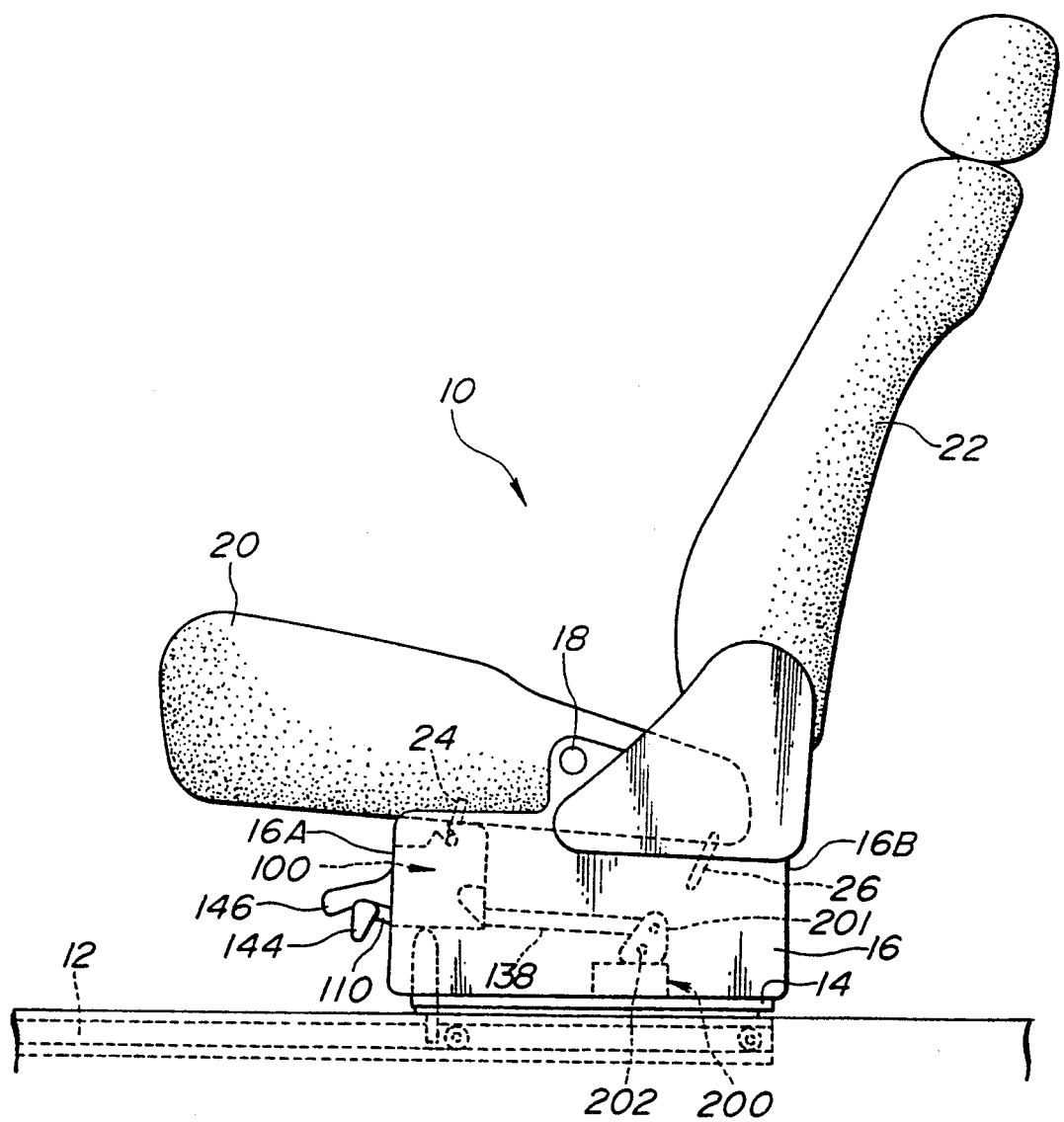
FIG. 1 is a side view of a seat assembly of the present invention in a condition wherein the seat assembly assumes a seat occupant holding position.
Figure 2:
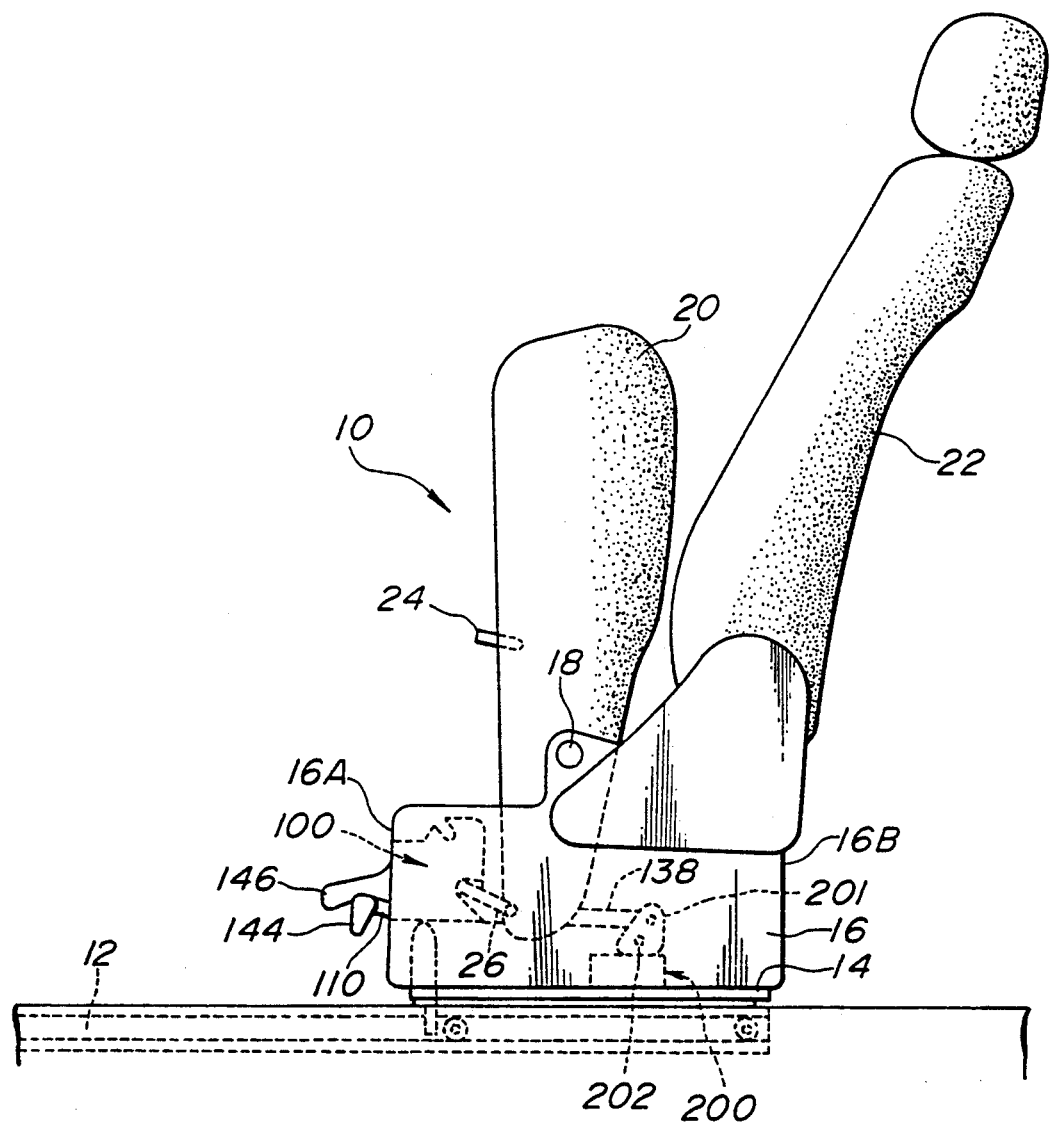
FIG. 2 is a view similar to FIG. 1, but showing a condition wherein the seat assembly is folded up.

Referring to FIGS. 1 and 2 of the drawings, there is shown a seat assembly 10 for a motor vehicle, which embodies of the present invention.

The seat assembly 10 generally comprises two lower rails 12 which are secured to a vehicle floor, two upper rails 14 which are slidably engaged with the fixed lower rails 12, two supporting members 16 which are respectively raised from the upper rails 14, a seat cushion 20 which is pivotally held by the supporting means 16 by means of a pivot shaft 18, so that the seat cushion 20 can take an operative (viz., seat occupant holding) position as shown in FIG. 1 and a folded position as shown in FIG. 2, and a seatback 22 which is mounted to the supporting members 16 through a known reclining mechanism, so that an inclination angle of the seatback 22 relative to the seat cushion 20 is adjustable.

As will become apparent as the description proceeds, the forward movement of the seat assembly 10 is carried out with the seat cushion kept folded up as shown in FIG. 2. When thus the seat assembly 10 assumes a front position, a larger luggage space is defined behind the seat assembly 10 in the vehicle cabin.

The seat cushion 20 has at its lower surface a first striker 24 secured thereto and at its rear lower surface a second striker 26 secured thereto. Each striker 24 or 26 is generally U-shaped. Reinforcing members are used for sucuring the strikers 24 and 26 to the seat cushion 20.

Figure 3:
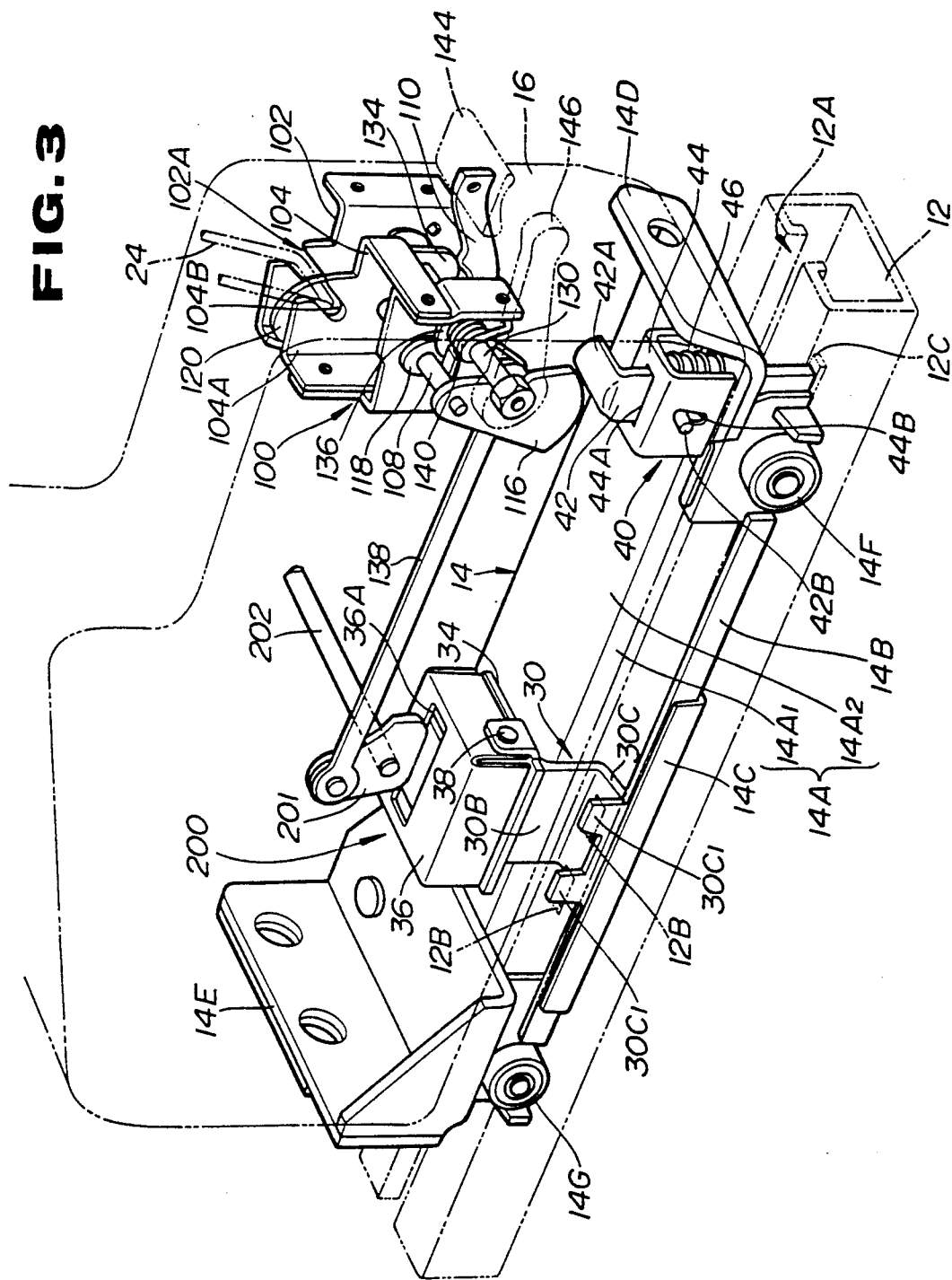
FIG. 3 is a perspective view of an essential portion of the seat assembly according to the present invention.

As is seen from FIG. 3, the illustrated supporting member 16 (which is placed at the right side with respect to a seat occupant sitting on the seat 20) is mounted on an upper surface of the upper rail 14.

Figure 4:
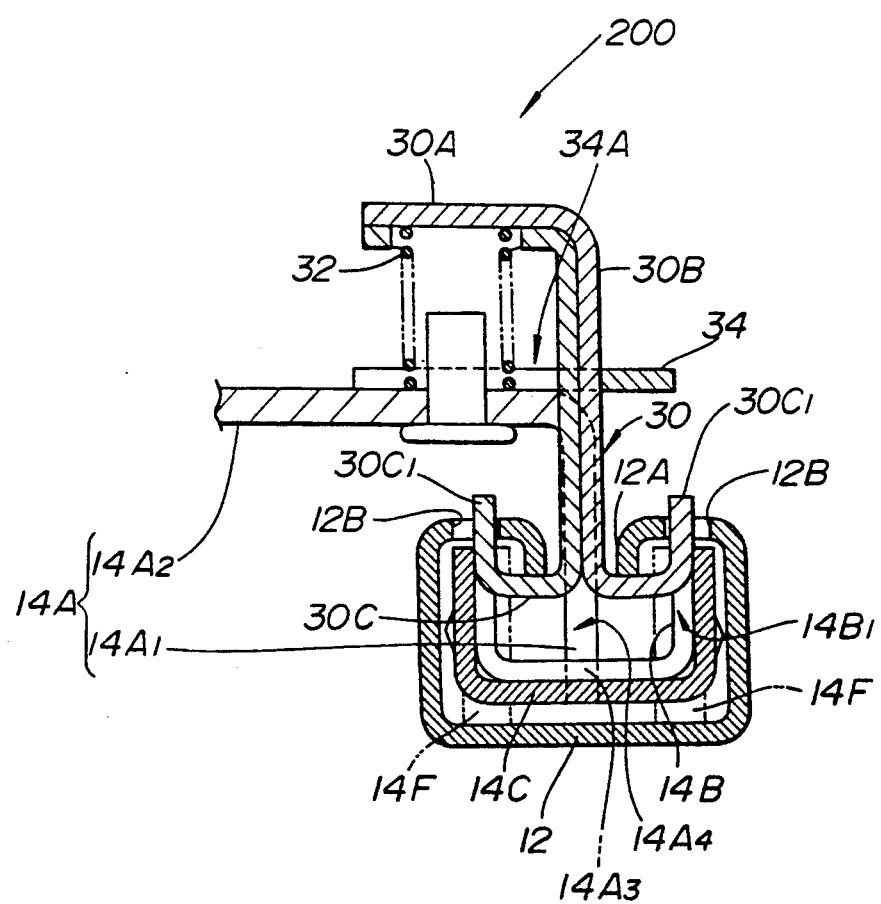
FIG. 4 is a sectional view of a seat slide latching mechanism employed in the present invention.

As is understood from FIG. 4, the upper rail 14 comprises an upper rail major portion 14A of generally L-shaped cross section which includes a vertical part 14A1 and a horizontal part 14A2, a longer inside reinforcing portion 14B of generally C-shaped cross section which is welded at its middle portion to the lower end of the vertical part 14A1 having the open side directed upward, and a shorter outside reinforcing portion 14C of generally C-shaped cross section which is welded at its middle part to both the lower end of the vertical part 14A1 and the inside reinforcing portion 14B having the open side directed upward. For assuring the connection of each reinforcing portion 14B or 14C with the major portion 14A, the lower end of the vertical part 14A1 is formed with a plurality of projections 14A3 each being received in corresponding aligned bores (no numerals) formed in the intimately overlapped parts of the inside and outside reinforcing portions 14B and 14C.

As is seen from FIG. 3, front and rear mounting brackets 14D and 14E are secured to the horizontal part 14A2 of the upper rail 14 for tightly supporting thereon the supporting member 16.

As is understood from FIGS. 3 and 4, the lower rail 12 has a generally C-shaped cross section and is arranged in a manner to have the axially extending slit 12A thereof directed upward. The overlapped inside and outside reinforcing portions 14B and 14C are received in the lower rail 12 having the vertical part 14A1 projected upward through the slit 12A. The entire of the lower rail 12 is accommodated in a groove formed in the vehicle floor as is seen from FIGS. 1 and 2.

As is seen from FIGS. 3 and 4, the upper side of the lower rail 12 is formed at its front and rear portions with front and rear groups of lock openings 12B, each group including two pairs of openings 12B. In the disclosed embodiment, the vertical part 14A1 of the upper rail 14A is provided at its front and rear ends with paired rollers 14F and 14G respectively, which rollers run on a flat bottom surface of the lower rail 12. Thus, the upper rail 14 can smoothly move relative to the lower rail 12.

Designated by numeral 200 is a seat slide latching mechanism which has latche member 30 for latching the upper rail 14 to the lower rail 12.

As is seen from FIGS. 3 and 4, the latch member 30 generally comprises a horizontal portion 30A, a vertical portion 30B and paired hook portions 30C movably received in the lower rail 12. The hook portions 30C are united in a back-to-back manner. Each hook portion 30C is formed with two latch pawls 30C1 which are engageable with corresponding two of the lock openings 12B of the lower rail 12. Between the horizontal portion 30A of the latch member 30 and the horizontal part 14A2 of the upper rail 14, there is disposed a compression spring 32 for biasing the latch member 30 upward, that is, in a direction to achieve the engagement of the latch pawls 30C1 with the lock openings 12B of the lower rail 12.

The arrangement of the latch member 30 relative to the upper rail 14 is so made that the vertical portion 30B is vertically movably received in the cut 14A4 formed in the vertical portion 14A1 of the upper rail 14 and the hook portions 30C are vertically movably received in a cut 14B1 formed in the inside reinforcing member 14B. The horizontal portion 14A2 of the upper rail 14 has a base plate 34 secured thereto. The base plate 34 is formed with a cut 34A through which the vertical portion 30B of the latch member 30 passes. As is seen from FIG. 4, a rectangular housing 36 is mounted on and secured to the base plate 34 by means of screws 38 to house the upper portion of the latch member 30. The housing 36 is formed with a rectangular aperture 36A through which the horizontal portion 30A of the latch member 30 is partially exposed.

Thus, usually, due to the force of the compression spring 32, the latch member 30 is biased upward relative to the upper rail 14. However, when the latch member 30 is applied with a considerable downward force, the same is moved downward relative to the upper rail 14 against the biasing force of the spring 32.

As is seen from FIG. 4, to the front mounting bracket 13D, there is mounted a sensor mechanism 40 which manages the latch cancelling operation of the seat cushion latching mechanism 100. The sensor mechanism 40 comprises a vertically movable actuating lever 42 which has a bent upper portion 42A. A guide pin 42B is fixed to a middle portion of the actuating lever 42. The actuating lever 42 has a lower portion projected into the lower rail 12 through mated apertures (not shown) formed in the mounting bracket 14D and the horizontal portion 14A2 of the upper rail 14. A generally U-shaped bracket 44 is secured to the front mounting bracket 14D for guiding the movement of the actuating lever 42. That is, the bracket 44 has at its upper part an elongate slot 44A through which the upper portion of the actuating lever 42 projects outward and at one side wall part a vertically extending guide slot 44B through which the guide pin 42B of the actuating lever 42 projects outward. A compression spring 46 is installed in the bracket 44 to bias the actuating lever 42 upward, that is, in a direction to achieve an abutment of the guide pin 42B with an upper end of the guide slot 44B.

When the actuating lever 42 is pressed down, the lower end of the same is inserted into a positioning opening 12C provided in a given part of the base portion of the lower rail 12.

Figure 5:
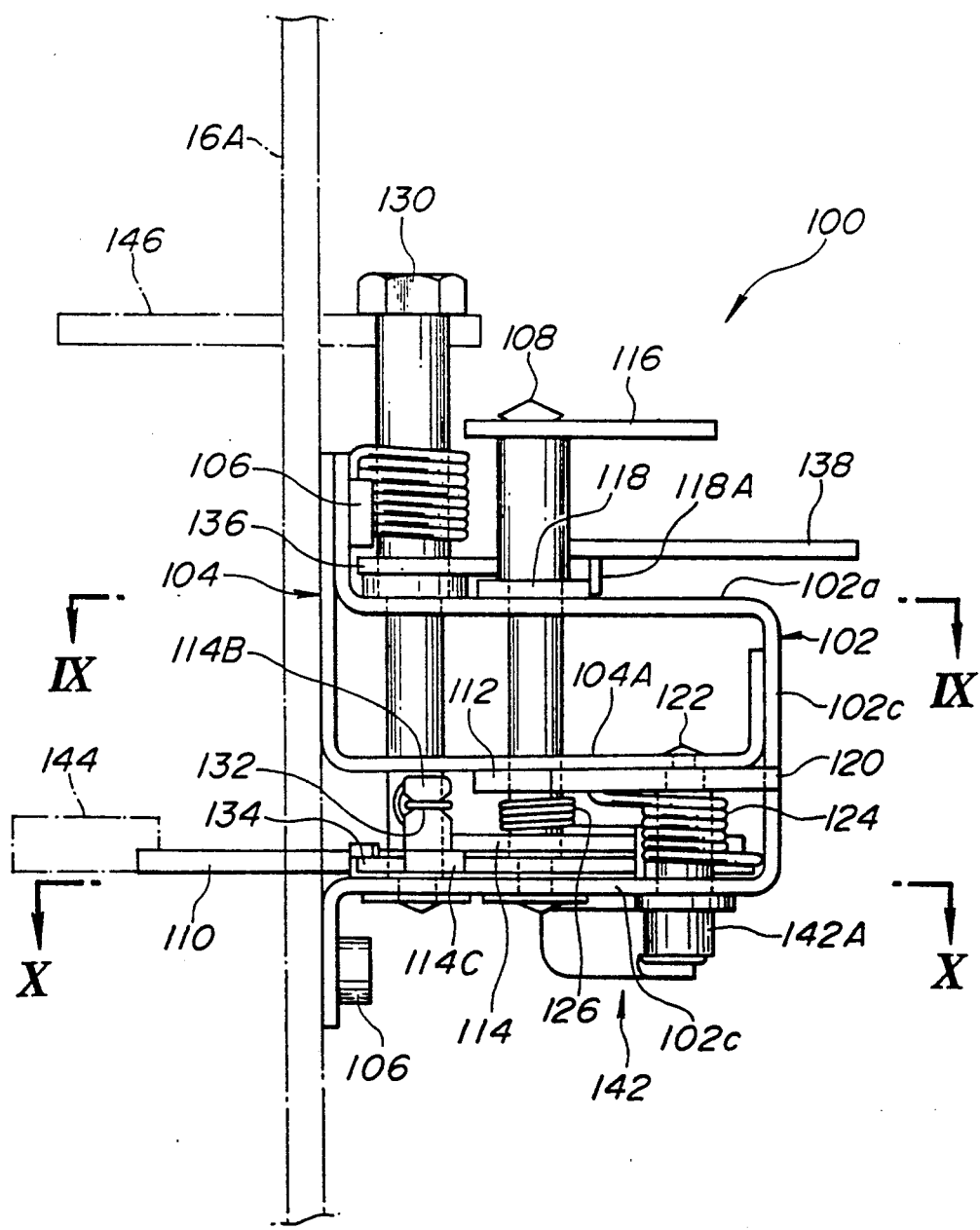
FIG. 5 is a plan view of a seat cushion latching mechanism also employed in the present invention.
Figure 9:
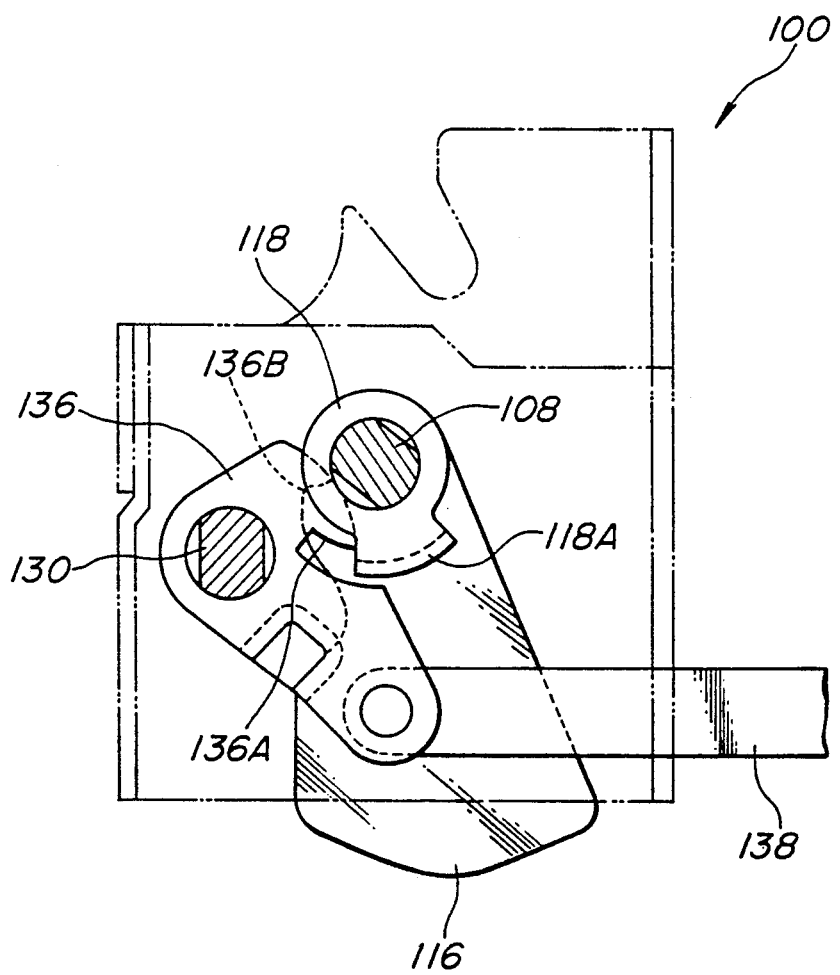
FIG. 9 is a sectional view taken along the line IX—IX of FIG. 5.

Referring to FIGS. 3, 5 and 9, designated by numeral 100 is a seat cushion latching mechanism, which comprises a base structure which is secured to a front wall 16A of the supporting member 16.

As is best seen from FIG. 5, the base structure includes a first base plate 102 and a second base plate 104. The first base plate 102 has opposed side walls 102a and 102b connected through a base wall 102c. The second base plate 104 is generally L-shaped and secured to the first base plate 102 in a manner to form an intermediate wall 104A between the opposed side walls 102a and 102b. The base structure (102+104) has a plurality of welded nuts 106 with which bolts (not shown) are engaged to secure the base structure (102+104) to the front wall 16A.

Designated by numeral 108 is a first pivot shaft which is rotatably supported by the base structure (102+104). More specifically, the first pivot shaft 108 passes through aligned three openings which are formed in the opposed side walls 102a and 102b of the first base plate 102 and the intermediate wall 104A of the second base plate 104.

An operative lever 110 is secured to the first pivot shaft 108 to pivot therewith. The operation lever 110 has a front portion which is exposed to the front of the front wall 16A. A first control handle 144 is secured to the front end of the operation lever 110.

As will be described in detail hereinafter, a latching plate 112 and a latch condition detecting lever 114 are pivotally connected to the first pivot shaft 108, and a cam plate 116 and a pawl member 118 are secured to the first pivot shaft 108 to pivot therewith. As will become apparent as the description proceeds, the the latch condition detecting lever 114 and the pawl member 118 form part of a latch cancelling inhibiting mechanism.

Designated by numeral 120 is a first latch member which can be latched by the above-mentioned latching plate 112. The first latch member 120 is pivotally disposed about a shaft 122 which are spanned and secured to the side wall 102b and the intermediate wall 104A of the base structure (102+104). A coil spring 124 is disposed about the shaft 122 to bias the first latch member 120 in a clockwise direction in FIG. 3, that is, in a clockwise direction in FIG. 7.

Figure 7:
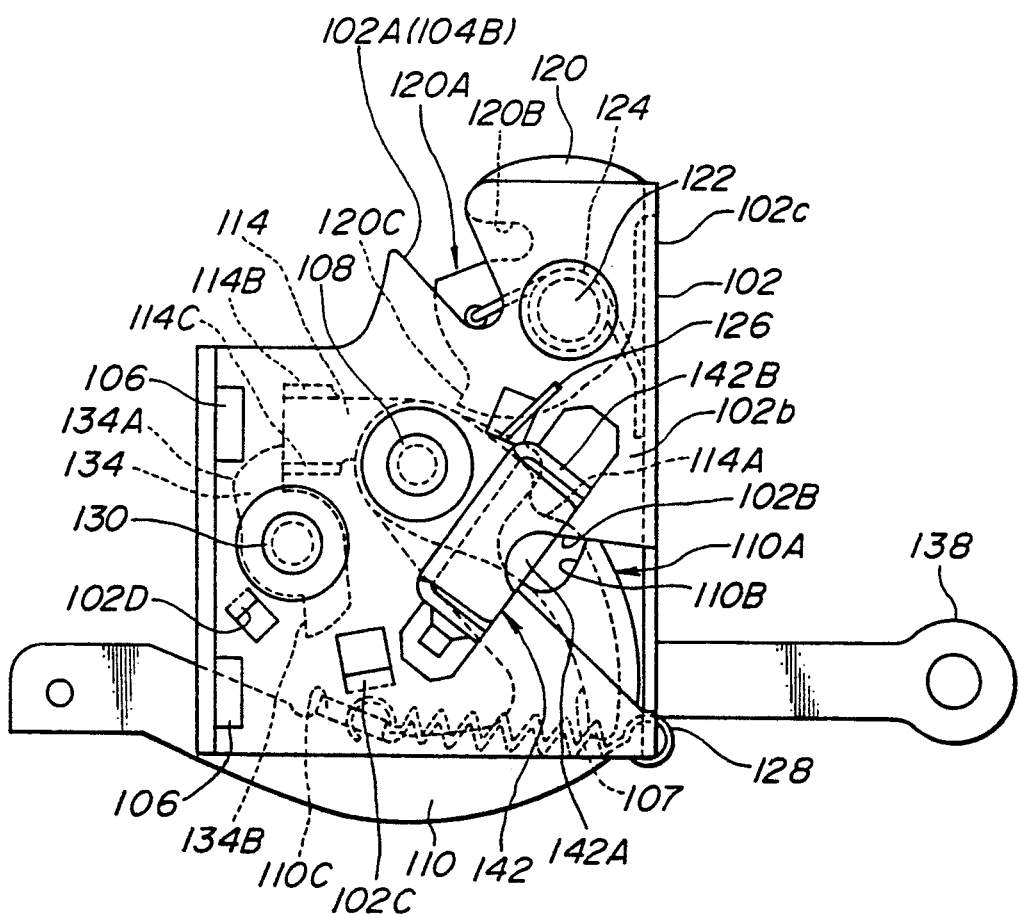
FIG. 7 is a left-side view of the seat cushion latching mechanism with a locking plate removed for clarification of the drawing.

As is understood from FIGS. 3 and 7, the side wall 102b and the intermediate wall 104A of the base structure (102+104) have at their upper portions respective recesses 102A and 104B which are aligned to receive the above-mentioned first striker 24.

The first latch member 120 is formed with a striker catching recess 120B by which the first striker 24 can be caught. The catching recess 120B has a lower peripheral side 120A against which the first striker 24 is collidable. Furthermore, the first latch member 120 is formed with a stepped portion 120C with which an end of the latching plate 112 is latchingly engageable.

Figure 10:
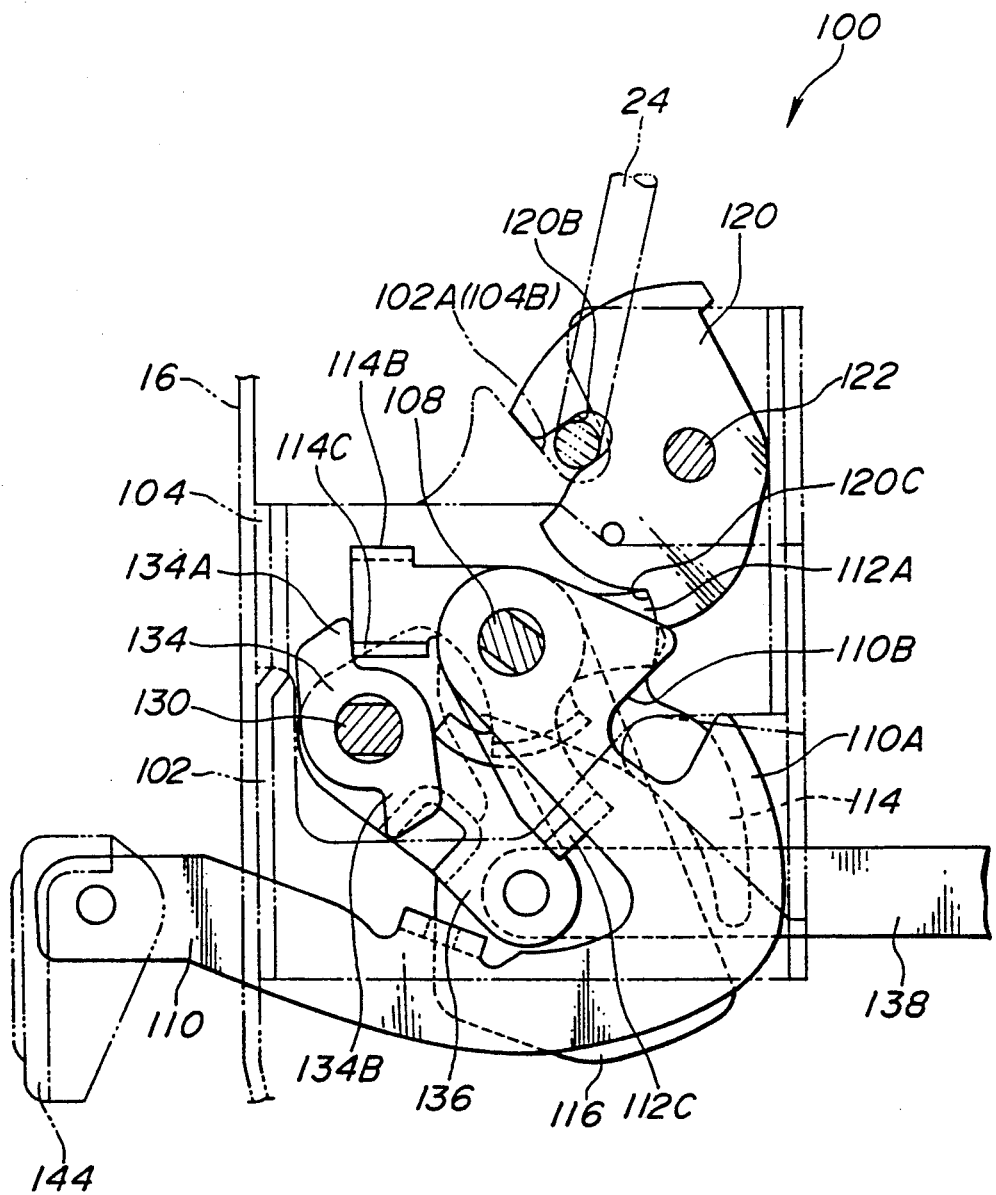
FIG. 10 is a sectional view taken along the line X—X of FIG. 5.
Figure 11:
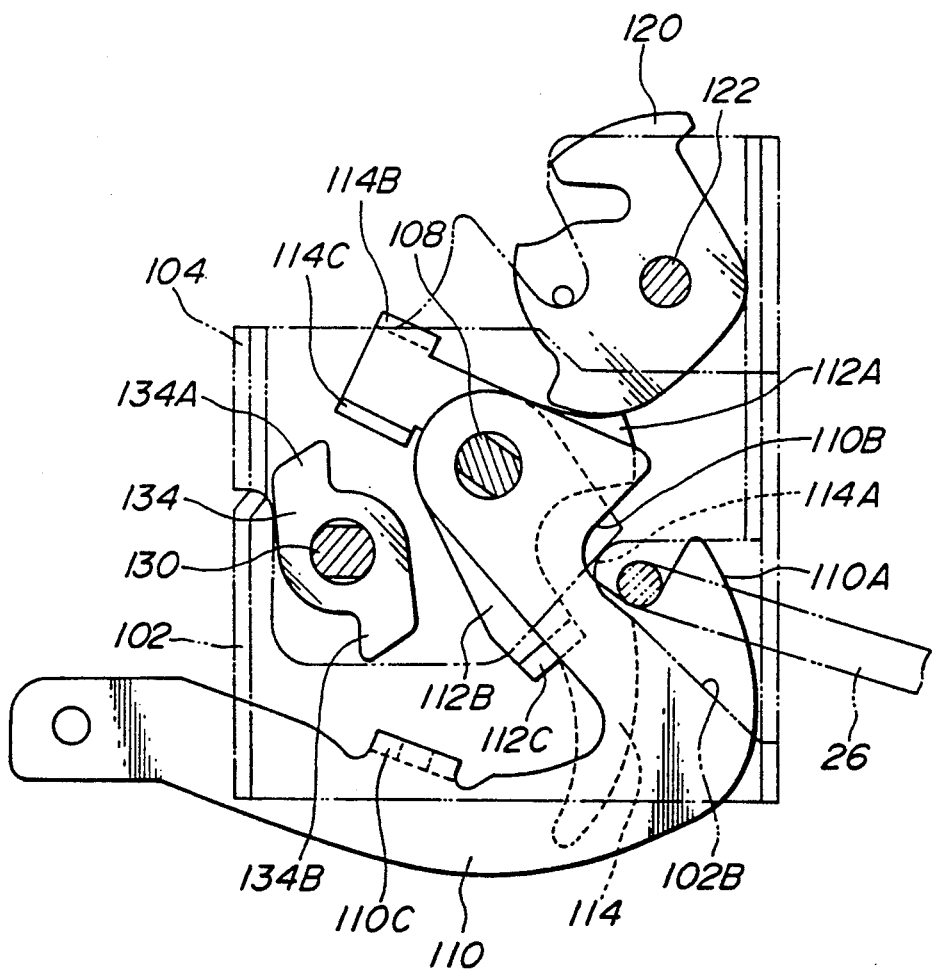
FIG. 11 is a view similar to FIG. 10, but showing a different condition of the seat cushion latching mechanism.

As in seen from FIGS. 10 and 11, the latching plate 112 is generally L-shaped and has a first leg portion 112A whose leading end is latchingly engageable with the stepped portion 120C of the first latch member 120, and a second leg portion 112B whose leading end has a bent portion 112C. The latching plate 112 is biased in a counterclockwise direction in FIG. 10 by a coil spring 126 (see FIG. 5) disposed about the first pivot shaft 108. Due to the force of the coil spring 126, the bent portion 112C of the latching plate 112 is forced to abut against the operation lever 110 to bias the same in the counterclockwise direction in FIG. 10.

The operation lever 110 serves as a second latch member by which the afore-mentioned second striker 26 can be caught. For this, the operation lever 110 is shaped like the character "J". The operation lever 110 is secured at its base portion to the first pivot shaft 108, as has been described hereinafore.

The operation lever 110 is formed near the base portion with a striker catching recess 110B by which the second striker 26 can be caught. The catching recess 110B has a lower shoulder portion 110A against which the second striker 26 is collidable. The operation lever 110 further has at a portion remote from the base portion a bent portion 110C.

As is seen from FIG. 7, a spring 128 extends between the base wall 102c of the base structure (102+104) and the bent portion 110C of the operation lever 110, so that the operation lever 110 is biased in a counterclockwise direction in FIG. 7 to abut against a portion of the base structure (102+104).

As is understood from FIG. 7, the side wall 102b and the base wall 102c of the base structure (102+104) are partially cut away to form an opening or recess 102B which is sized to accommodate the second striker 26.

The side wall 102b of the base structure (102+104) is integrally formed with a raised stopper piece 102C to which the operation lever 110 is contactable thereby to restrict the upward pivoting of the operation lever 110 to a certain degree.

As is understood from FIG. 7, the latch condition detecting lever 114 is generally arcuate in shape, whose terminal end portion is located near the recess 102B. The detecting lever 114 is formed at its middle portion with a recess 114A with which the second striker 26 is engageable. The detecting lever 114 is further formed at its head portion with first and second bent portions 114B and 114C which face each other.

As is seen from FIG. 5, the first bent portion 114B holds one end of a spring 132 whose other end is hooked to a second pivot shaft 130 which will be described hereinafter. With the spring 132, the latch condition detecting lever 114 is biased in a counterclockwise direction in FIG. 7.

The second pivot shaft 130 extends in parallel with the first pivot shaft 108 and is pivotally supported by the side walls 102a and 102b and the intermediate wall 104A of the base structure (102+104), as is best seen from FIG. 5.

A stopper member 134 and an arm member 136 are secured to the second pivot shaft 130 to pivot therewith.

As is seen from FIG. 7, the stopper member 134 is formed at diametrically opposed portions of the second pivot shaft 130 with first and second stopper parts 134A and 134B. The first stopper part 134A is engageable with the second bent portion 114B of the latch condition detecting lever 114, while the second stopper part 134B is engageable with an engaging part 102D which is raised from the side wall 102b of the base structure (102+104).

As is seen from FIG. 9, the arm member 136 has a leading end to which a connecting link 138 from the seat slide latching mechanism 200 is pivotally connected. The arm member 136 is formed at its middle portion with an arcuate recess 136A. Under an aftermentioned given condition, a pawl 118A of the pawl member 118 is inserted into the recess 136A to suppress the pivotal movement of the arm member 136. The arm member 136 further has an arcuate portion 136B (see FIG. 9) which is contactable with the pawl 118A.

Figure 6:
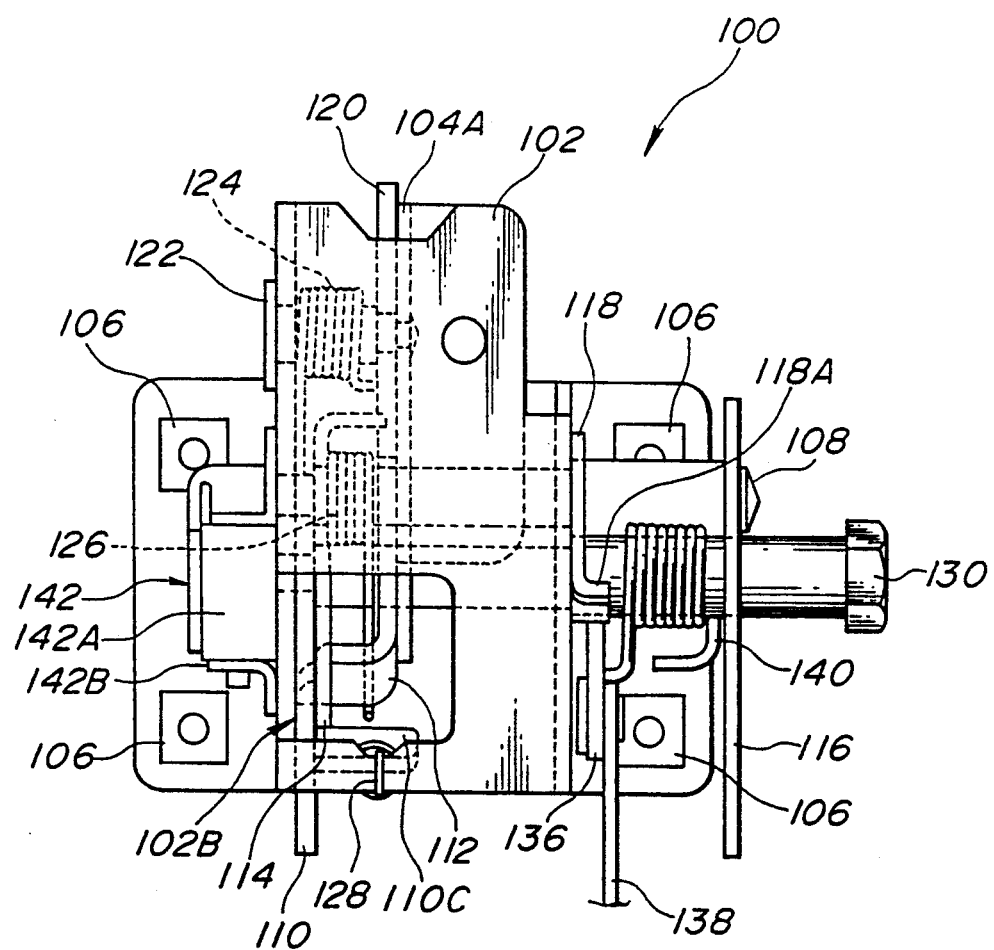
FIG. 6 is a back view of the seat cushion latching mechanism.
Figure 8:
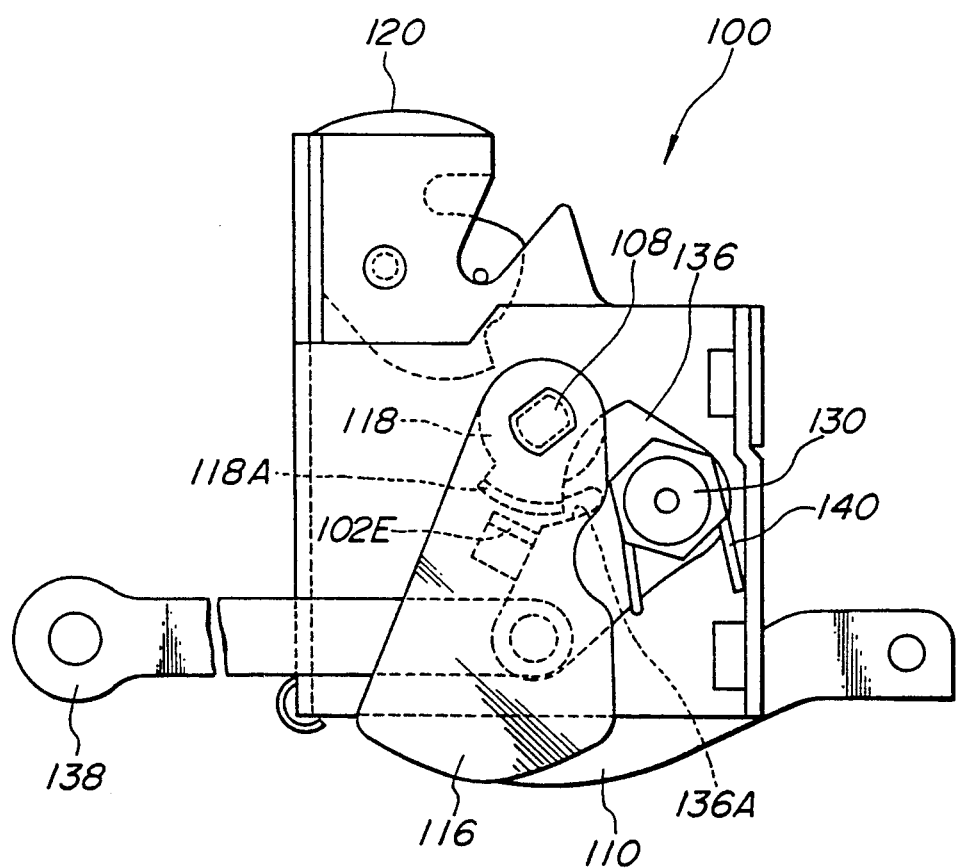
FIG. 8 is a right-side view of the seat cushion latching mechanism.

As is best seen from FIG. 6, a coil spring 140 is disposed about the second pivot shaft 130 to bias the arm member 136 (see FIG. 5) and thus the second pivot shafat 130 in a counterclockwise direction in FIG. 7, that is, in a clockwise direction in FIG. 8.

As is seen from FIG. 8, with the biasing force of the spring 140, the arm member 136 is forced to contact with a stopper piece 102E pressed out of the side wall 102a of the base structure (102+104).

Designated by numeral 142 in FIGS. 5, 6 and 7 is a damper device which is mounted to the side wall 102b of the base structure (102+104) near the recess 102B. The damper device 142 comprises an elastic member 142A which is exposed to the recess 102B and a case 142B which is secured to the side wall 102b to house the elastic member 142A. As is understood from FIG. 7, the damper device 142 damps a shock produced when the second striker 26 is led into the recess 102B.

As is seen from FIG. 3, a second control handle 146 is secured to the second pivot shaft 130 to manually operate the same. The second and the afore-mentioned first control handle 146 and 144 may be constructed of rigid plastics.

As is seen from FIG. 3, the connecting link 138 has a rear end pivotally connected to a cam plate 201 which is connected to a pivot shaft 202. The pivot shaft 202 is supported by the right and left supporting members 16 in a manner to rotate about its axis. The cam plate 201 is in contact with the horizontal portion 30A of the latch member 30 through the rectangular aperture 36A of the housing 36. Thus, upon rotation of the cam plate 201 in a given direction, the latch member 30 is pressed downward and thus the latched engagement between the upper and lower rails 14 and 12 becomes cancelled permitting free movement of the seat assembly 10 on and along the fixed lower rails 12.

The cam plate 116 fixed to the first pivot shaft 108 has a cam surface slidably engaged with the bent upper portion 42A of the actuating lever 42.

In the following, operation will be described.

For ease of understanding, the description will be commenced with respect to the condition of FIG. 1 wherein the seat assembly 10 assumes its rear latched position and the seat cushion 20 assumes its operative latched (or seat occupant holding) position.

Under this condition, the seat slide latching mechanism 200 assumes a condition wherein the latch member 30 is latchingly engaged with the rear group of lock openings 12B and the seat cushion latching mechanism 100 assumes a first striker latching condition as depicted by FIG. 10. That is, the first striker 24 is received in the aligned recesses 102A and 104B of the base structure (102+104) and latchingly caught by the catching recess 120B of the first latch member 120. Due to the biasing force of the coil spring 124, the stepped portion 120C of the first latch member 120 is forced to abut against the first leg portion 112A of the latching plate 112 thereby keeping the first latch member 120 at the latching position. Furthermore, due to biasing force of the spring 132, the latch condition detecting lever 114 is biased in a counterclockwise direction in FIG. 10 causing the second bent portion 114C thereof to engage with the first stopper part 134A of the stopper member 134. Accordingly, rotation of the second pivot shaft 130 and thus that of the arm member 136 in a clockwise direction in FIG. 10 due to manipulation of the second control handle 146 are suppressed. That is, the movement of the connecting link 138 in a direction to operatively pivot the cam plate 201 is suppressed.

Thus, under this seat occupant holding condition of the seat cushion 20, the latched condition of the seat slide latching mechanism 200 can not be cancelled by the second control handle 146.

When now cancellation of the latched condition of the seat occupant 20 is needed, the first control handle 144 is pulled in the upward direction A in FIG. 10 to such a degree that the operation lever 10 is brought into contact with the raised stopper piece 102C. During this, the first pivot shaft 108 is also rotated in the same direction because the operation lever 110 is secured to the first pivot shaft 108. Furthermore, during this, the latching plate 112 is rotated in the same direction together with the operation lever 110 because the bent portion 112C of the latching plate 112 is kept forced to abut against the operation lever 110, so that the first leg portion 112A of the latching plate 112 is disengaged from the stepped portion 120C of the first latch member 120. As a result, due to the force of the coil spring 124, the first latch member 120 is returned to its original or neutral position releasing the first striker 24.

Thus, thereafter, the seat cushion 20 is permitted to pivot freely about the pivot shaft 18 (see FIG. 1).

Figure 12:
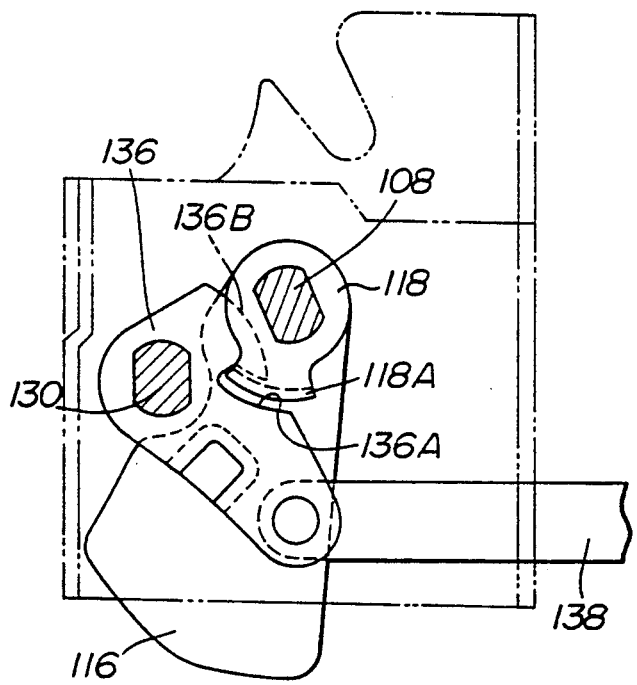
FIGS. 12 and 13 are views similar to FIG. 9, but showing different conditions.
Figure 13:
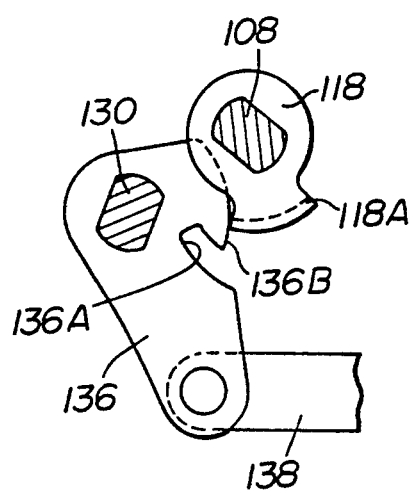

During the above-mentioned operation of the operation lever 110, the pawl member 118 secured to the first pivot shaft 108 is simultaneously rotated, so that, as is seen from FIG. 12, the pawl 118A of the pawl member 118 is engaged with the recess 136A of the arm member 136 preventing the second control handle 146 from pivoting the arm member 136. Thus, during the operation of the operation lever 110, the latch cancelling operation of the seat slide latching mechanism 200 is inhibited.

When the seat cushion 20 thus released is folded up or pivoted in a clockwise direction in FIG. 2 by a certain degree, the second striker 26 is led into the recess 102B of the base structure (102+104) and collides with both the lower shoulder portion 110A of the operation lever 110 and the latch condition detecting lever 114 to rotate them in a clockwise direction in FIG. 10. Finally, the movement of the second striker 26 induces a second striker latching condition of FIG. 11 wherein the second striker 26 is caught by both the recess 110B of the operation lever 110 and the recess 114A of the lever 114. It is to be noted that the collision of the second striker 26 against the levers 110 and 114 is damped by the damper device 142.

The seat cushion 20 thus assumes a folded up and latched position as shown in FIG. 2.

As is seen from FIG. 11, under this condition, by the second striker 26, the latch condition detecting lever 114 is forced to assume its leftmost position against the force of the spring 132, so that the second bent portion 114C of the lever 114 is disengaged from the first stopper part 134A of the stopper member 134. Accordingly, under such condition, manipulation of the second control handle 146 for cancelling the latched condition of the seat slide latching mechanism 200 is permitted.

That is, when the second control handle 146 is pivoted upward rotating the second pivot shaft 130, the arm member 136 is rotated and thus the connecting link 138 is pulled to pivot the cam plate 201 of the seat slide latching mechanism 200. Due to the pivoting of the cam plate 201, the latch member 30 is moved down against the force of the spring 32 releasing the latch pawls 30C1 of the latch member 30 from the lock openings 12B of the lower rail 12. Thus, the latched engagement of the upper rail 14 relative to the lower rail 12 becomes cancelled.

Accordingly, under this condition, the seat assembly 10 can be moved freely toward the front position with the seat cushion 20 kept folded up and latched.

During the pivoting movement of the arm member 136 by the second control handle 146, the pawl 118A of the pawl member 118 is in engagement with the arcuate portion 136B of the arm member 136 preventing the rotation of the first pivot shaft 108. Thus, the latch cancelling operation of the seat cushion latching mechanism 100 is inhibited.

During the movement of the seat assembly 10, the second control handle 146 is released from an operator's hand. Thus, during the seat movement, the latch pawls 30C1 of the latch member 30 are biased to slide on the lower surfaces of the upper side of the lower rail 12 due to the force of the spring 32.

When thus the seat assembly 10 comes to the given front position, the latch pawls 30C1 of the latch member 30 are forced to fall into the front group of lock openings 12B achieving a latched engagement of the upper rail 14 relative to the lower rail 12.

Thus, in this condition, the seat assembly 10 assumes the front latched position with the seat cushion 20 folded up and latched, and a larger luggage space is defined behind the seat assembly 10.

When the occupant holding condition of the seat assembly 10 is needed again, the second control handle 146 is manipulated and the seat assembly 10 is moved to the given rear position. For the same reason as mentioned hereinabove, upon arrival of the seat assembly 10 at the rear given position, a latched engagement of the upper rail 14 to the lower rail 12 is established, as is understood from FIG. 2.

Then, for cancellation of the latched condition of the folded seat cushion 20, the first control handle 144 (viz., the operation lever 110) is pulled upward to such a degree that the operation lever 110 becomes in contact with the stopper piece 102C of the side wall 102b of the base structure (102+104). With this operation, the recess 110B of the operation lever 110 releases the second striker 26. Thus, thereafter, the seat cushion 20 is permitted to pivot freely about the pivot pin 18.

During the pivoting movement of the operation lever 110, the pawl 118A of the pawl member 118 is in engagement with the recess 136A of the arm member 136 and thus the latch cancelling operation of the seat slide latching mechanism 200 is inhibited.

It is to be noted that, as is seen from FIG. 3, the upward pivoting of the first control handle 144 causes the cam plate 116 to press the bent upper portion 42A of the actuating lever 42 downward. Since, in this state, the actuating lever 42 is placed just above the positioning opening 12C of the lower rail 12, the actuating lever 42 thus pressed is inserted into the opening 12C allowing full pivoting of the cam plate 116. Thus, if the seat assembly 10 fails to take the proper rear position, the insertion of the actuating lever 42 into the positioning opening 12C is not permitted, and thus, the upward pivoting of the first control handle 144 is not permitted. This means that when the seat assembly 10 is not properly placed at the given rear position, the latched condition of the folded seat cushion 20 can not be cancelled.

When the seat cushion 20 thus released is pressed downward, the first striker 24 is led into the aligned recesses 102A and 104B of the base structure (102+104) and collides against the lower peripheral side 120A of the first latch member 120 to rotate the member 120 in a counterclockwise direction in FIG. 7 against the force of the coil spring 124. The insertion of the first striker 24 into the aligned recesses 102A and 104B induces finally the first striker latching condition of FIG. 8 which has been described in detail hereinafore. Thus, the seat occupant holding condition as shown in FIG. 1 is established.

As will be understood from the foregoing description, in the seat assembly of the present invention, when one of the seat cushion and seat slide latching mechanisms is being manipulated for cancelling its latched condition, the other mechanism is inhibited from cancelling its latched condition. Accordingly, unexpected sliding of the seat assembly during manipulation of the seat cushion latching mechanism and unexpected pivoting of the seat cushion during manipulation of the seat slide latching mechanism are assuredly suppressed.

What is claimed is:

1. A seat assembly for a motor vehicle, comprising:
   a lower rail secured to a floor of the vehicle;
   an upper rail slidably engaged with the lower rail;
   a base structure secured to the upper rail to move therewith;
   a seat cushion held by the base structure in a manner to pivot between a horizontal operative condition and an upright inoperative condition;
   a seat slide latching mechanism for latching the upper rail to the lower rail, the seat slide latching mechanism having a first cancelling means which cancels the latched condition of the upper rail when actuated;
   a seat cushion latching mechanism for latching the seat cushion at both the horizontal operative and upright inoperative positions relative to the base structure, the seat cushion latching mechanism having a second cancelling means which cancels the latched condition of the seat cushion when actuated; and
   a latch cancel inhibiting means for inhibiting the actuation of one of the first and second cancelling means when the other of the first and second cancelling means is being actuated.

2. A seat assembly as claimed in claim 1, in which said seat slide latching mechanism comprises:
   means defining in said lower rail at least one lock opening;
   a latch member movably held by said upper rail, said latch member having a latch pawl which is latchingly engageable with said lower rail;
   biasing means for biasing said latch member in a direction to achieve the engagement between said latch pawl and said lock opening;
   a control handle incorporated with said seat cushion latching mechanism; and
   a first link mechanism extending between said latch member and said control handle, said first link mechanism being so constructed that when said control lever is moved in a given direction, said latch member is moved against said biasing means in a direction to cancel the latched engagement between said latch pawl and said lock opening.

3. A seat assembly as claimed in claim 2, in which said seat cushion latching mechanism comprises:
   first and second strikers secured to spaced portions of said seat cushion;
   a first latching means for latching said first striker when said seat cushion assumes said horizontal operative position;
   a second latching means for latching said second striker when said seat cushion assumes said upright inoperative position;
   an operation lever pivotally supported by said base structure; and
   a second link mechanism linking said operation lever to both said first and second latching means so that a pivotal movement of said operation lever in a given direction to cancel a latched condition of either one of said first and second latching means.

4. A seat assembly as claimed in claim 3, in which said first latching means comprises:
   a first latch member pivotally supported by said base structure, said first latch member being formed with a catching recess by which said first striker is caught when said seat cushion assumes said horizontal operative position; and
   first biasing means for biasing said first latch member in a releasing direction to release said first striker from said catching recess;
   and in which said second latching means comprises:
   means for defining a catching recess in said operation lever, said catching recess catching said second striker when said seat cushion assumes said upright inoperative position; and second means for biasing said operation lever in a given direction to assure the catching of said second striker by said catching recess of said operation lever.

5. A seat assembly as claimed in claim 4, in which said first link mechanism comprises:

a cam plate pivotally connected to said base structure and having a cam surface engageable with said latch member;

a connecting link having one end pivotally connected to said cam plate;

an arm member secured to said pivot shaft to rotate therewith, said arm member being pivotally connected to the other end of said connecting link; and biasing means for biasing said control handle in a direction opposite to said given direction.

6. A seat assembly as claimed in claim 5, in which said second link means comprises:

a latching plate pivotally supported by said base structure, said latching plate having first and second leg portions, said first leg portion being engageable with a stepped portion of said first latch member to suppress the rotation of said first latch member in said releasing direction;

third biasing means for biasing said latching plate in such a direction as to force said second leg portion to abut against said operation lever to bias the same in said given direction, whereby said pivotal movement of said operation lever in said given direction is made against the force of said second and third biasing means and rotates said latching plate in a direction to disengage said first leg portion from said stepped portion of said first latch member.

7. A seat assembly as claimed in claim 6, in which said second link mechanism further comprises:

a stopper member secured to said pivot shaft to which said control lever is secured; and a latch condition detecting lever pivotally connected to said base structure and having one end which can latch said stopper member thereby to suppress pivoting of said control handle in said given direction, said lever cancelling the latched condition of said stopper member when said second striker is latched by said second latching means.

8. A seat assembly as claimed in claim 7, in which said second link mechanism further comprises:

a pawl member pivotally connected to said base structure, said pawl member pivoting together with said operation lever and having a pawl; and an arm member pivotally connected to said base structure and having a recess into which said pawl is inserted when said pawl member pivots in a given direction.

9. A seat assembly as claimed in claim 1, further comprising a positioning means which permits the cancelling of the latched condition of said seat cushion at said upright inoperative position by said seat cushion latching mechanism only when said upper rail assumes a proper position relative to said lower rail.

10. A seat assembly as claimed in claim 9, in which said positioning means comprises:

means defining a positioning opening in said lower rail;

an actuating lever vertically movably carried by said upper rail and having a lower portion which faces said positioning opening when said upper rail comes to said proper position;

biasing means for biasing said actuating lever in a direction to move away from said positioning opening; and a cam member actuated by said seat cushion latching mechanism and slidably engageable with an upper portion of said actuating lever, whereby when, with said upper rail assuming the proper position, said cam member is pivoted in a direction by said seat cushion latching mechanism, the same presses down said actuating lever into said positioning opening against the force of said biasing means.

* * * * *